April 16, 1935.  J. ROMANO  1,998,289
HYDRAULIC AUTOMOBILE JACK
Filed Feb. 16, 1934   2 Sheets-Sheet 2
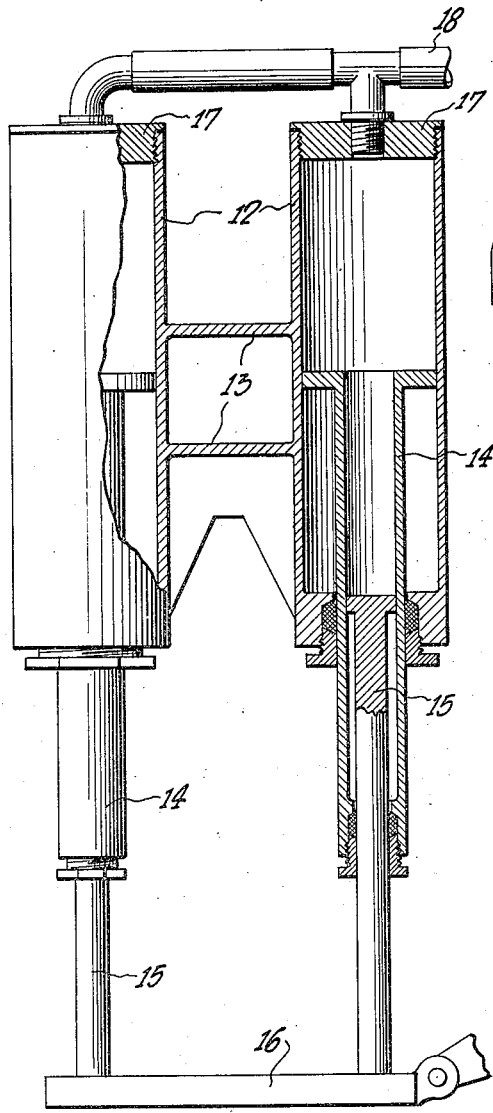
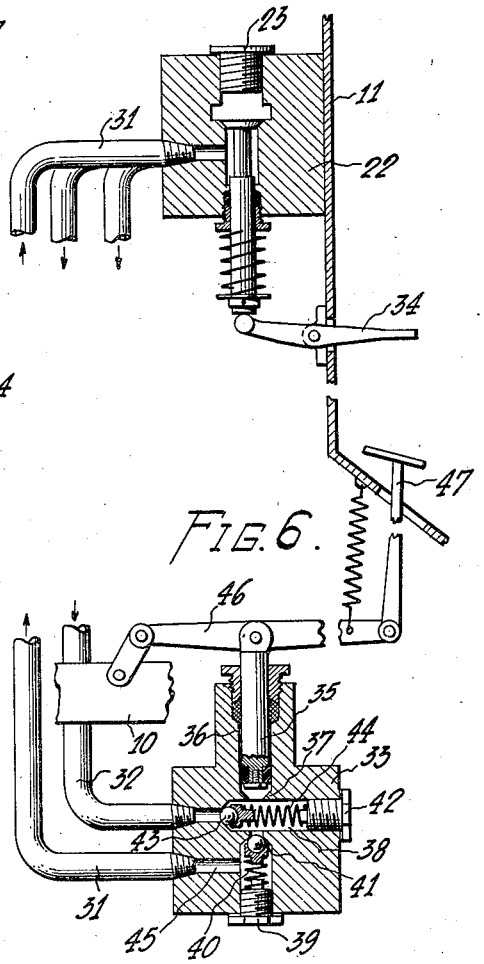
INVENTOR
Joseph Romano
BY
Hedermann
ATTORNEY Patented Apr. 16, 1935

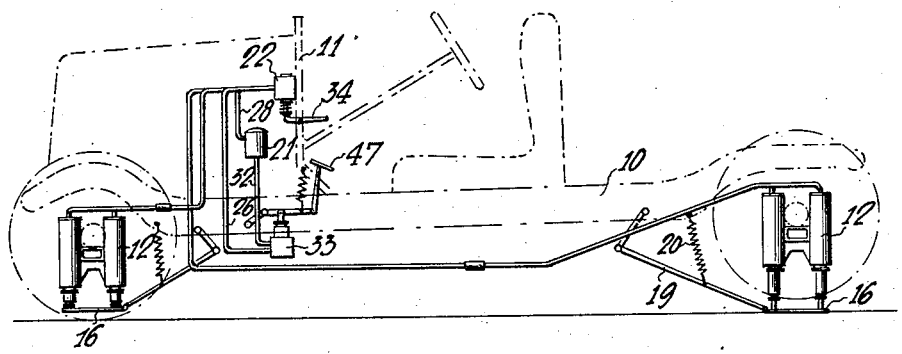
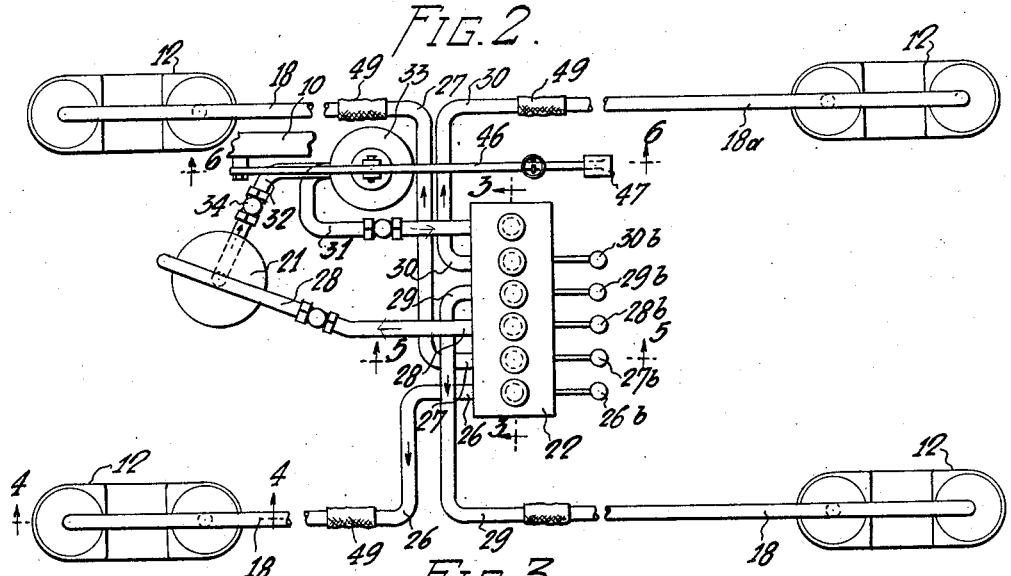
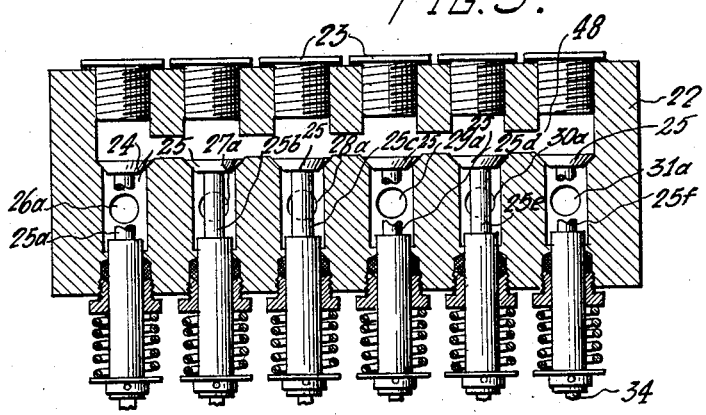

1,998,289

UNITED STATES PATENT OFFICE 1,998,289

HYDRAULIC AUTOMOBILE JACK

Joseph Romano, Brooklyn, N. Y.

Application February 16, 1934, Serial No. 711,502

1 Claim. (Cl. 254—86)

The main object of this invention is the provision of a set of hydraulic jacks comprising individual jack members set one adjacent each of the four wheels of an automobile and selectively operable from within the car to jack up any one of the wheels as desired.

Another object of the invention is the provision of the hydraulic jacks as above-mentioned in a closed circulating system utilizing oil, the levers for operating the jacks being situated adjacent the driver of the vehicle.

Still another object of the invention is the provision of a pair of telescopically extensible jacks united by a cross-member, at each of the wheels of the vehicle, so that a positive raising of the wheels is at all times assured regardless of the nature of, or angle with the horizontal of, the road at that point.

The above and other objects will become apparent in the description below, in which characters of reference refer to like-named parts in the drawings.

Referring briefly to the drawings, Figure 1 is a schematic side elevational view, showing the jacking system applied to an automobile.

Figure 2 is a plan view of Figure 1.

Figure 3 is a cross-sectional view taken on line 3—3 of Figure 2.

Figure 4 is a cross-sectional view taken on line 4—4 of Figure 2.

Figure 5 is a cross-sectional view taken on line 5—5 of Figure 2.

Figure 6 is a cross-sectional view taken on line 6—6 of Figure 2.

Referring in detail to the drawings, the numeral 10 represents the chassis of an automobile having the dash board 11. At each of the four wheels of the vehicle, a jack unit is mounted, comprising a pair of identical housings 12 rigidly connected by tie-beams 13. A hollow-stem piston 14 is slidably mounted in each housing 12, and in the stem of each piston 14 a piston 15 is slidably mounted, the latter providing the column extending to the base of each unit. At their lower extremities, these columns 15 are rigidly united by a cross-beam 16 which strikes the road when the jacks are operated to raise the vehicle. Suitable packing and other construction necessary to make the jack units leak-proof, are of course included in their design. The tops 17 of the housings 12 are provided with ports into which branches from the feed pipe 18 are conducted. An arm 19 is pivoted to one end of the cross-beam 16 and at the other is linked to the chassis, a coiled spring 20 normally tending to raise the jack end of the arm.

Mounted in front of the dash board is an oil storage tank 21, and adjacent the latter is a distributor tank 22. The latter comprises a housing provided with six aligned openings at the top normally closed by caps 23. Directly beneath each opening 23, cylindrical bores 24 are provided. In each bore 24 a valve 25 is slidably mounted, the stems of the valves protruding below the housing 22, their extremities being provided with springs normally forcing them down, that is, into closed position. These valve stems are indicated, reading from left to right, Figure 3, by the reference numerals 25a, 25b, 25c, 25d, 25e, and 25f. A port is provided in each bore 24 leading through the housing wall, and a pipe leads from each port on the outside of the housing. These pipes are indicated by the numbers 26, 27, 28, 29, 30 and 31, and for convenience the corresponding port of each pipe is numbered 26a, 27a, 28a, 29a, 30a, and 31a, respectively. The pipe 28 leads to the top of the storage tank 21, and from the bottom of the latter a pipe 32 leads to the pump 33. Through the pipe 32, which is provided with a one-way flow valve 34, oil passes into the pump 33. The oil passes from the pump through the pipe 31 into the tank 22 through the port 31a. From each of the valve stems 25, excepting the end one 25f, key levers 34 extend through the dash board 11 into the driver's compartment, the levers 34 being pivoted in the dash board. Each lever has a button on its end, each bearing proper markings or insignia to indicate which of the four wheels it controls. By depressing any one of these keys, which are numbered 26b, 27b, 28b, 29b, and 30b, to correspond with the valves which they control, the valve stem connected to that key will be raised, thus opening that valve in the compartment of the tank 22. The pipe 28 also contains a one-way flow valve.

The pump 33 comprises a housing having a piston 35 vertically slidable therein in a bore 36. An obstruction 37 is provided about midway in the bore in order to narrow the latter at that point. A second bore 38 intersects the bore 36 through the narrowed portion. The lower end of the bore 36 is closed by a cap 39 having a ball 41 projected by a spring 40 normally against the lower end of the narrowed bore 36. Similarly, a cap 42 closes the bore 38, and is provided with a ball 43 projected by a spring 44 to normally close the other end of the bore 38. The pump inlet pipe 32 is connected to the ball end of the bore 38 (being normally closed by the ball 43), and the pump outlet pipe 31 is connected to an extension 45 leading into the bore 36. A lever 46 is pivoted to the top of the piston 35, and is operable by a pedal 47 to work the pump in a manner which is obvious. It is to be noted that oil pumped through the pipe 31 enters the tank 22 through the port 31a, the pressure of the pumped oil causing the valve 25f to rise.

The operation of the device is as follows. Assuming that it is desired to raise the right rear wheel, the key 30b is depressed, raising valve 25e in tank 22. The pedal 47 is then worked down and up to pump oil from the tank 21 into the tank 22. The oil leaves the pump through pipe 31, forces the valve 25f up, and passes into the compartment 48 of the tank 22. Since all the other valves 25 are closed, the oil will pass from the compartment 48 into the bore of valve 25e, through the port 30a, through pipe 30, into pipe 18a, and down into the right rear jack unit 12, forcing the jack to extend and raise the car. It is to be noted that all of the pipes 18 leading from the jacks are connected to the pipes leading from the tank 22 through flexible couplings 49. When the car is raised, balls 41 and 43 of the pump 33 prevent return of the oil from the jack, so that the car will remain raised as long as desired after removing the foot from pedal 47 and releasing key 30b. To restore the jack to elevated, idle position, key 28b is depressed, opening valve 25c, permitting flow of the oil from compartment 48 through pipe 28 into tank 21. The weight of the sinking car at first, and then the spring 20, will force the jack to contract and force the oil back along pipe 18a—30 into tank 22 (the pressure of the oil causing the valve 25e to open to permit this passage). When the jack has been retracted fully, key 28b is released, and the device is restored to its original, inactive position.

In the illustration, the wheel axles have been shown mounted on the upper tie-beams 13 of the jack units, but obviously they might be otherwise mounted thereon. Also, obvious modifications in form and structure may be made without departing from the spirit and scope of the invention.

I claim:

In an automobile jack system comprising a plurality of hydraulic jack units mounted one adjacent each wheel, and a fluid tank and a pump adapted to force fluid into said jack units, jack units comprising a pair of spaced-apart vertical cylinders having pistons slidable therein adapted to be extended upon the flow of fluid into said cylinders, a rigid tie-beam joining said cylinders, said tie-beam being secured to the axle of the wheel, a rigid cross-beam uniting said pistons at their lower ends, a pivoted link extending from said cross-beam, and resilient means attached to the frame of the automobile and to the said link adapted to retract the jack pistons.

JOSEPH ROMANO.